United States Patent
Chu et al.

(10) Patent No.: US 8,781,607 B2
(45) Date of Patent: Jul. 15, 2014

(54) SYSTEM, METHOD AND RECORDING MEDIUM FOR DRIVING A PROGRAMMABLE LOGIC CONTROLLER

(75) Inventors: Tun-Hsiao Chu, Kaohsiung (TW); Hong-En Chen, Tainan (TW)

(73) Assignee: Institute For Information Industry, Taipei (TW)

( * ) Notice: Subject to any disclaimer, the term of this patent is extended or adjusted under 35 U.S.C. 154(b) by 429 days.

(21) Appl. No.: 13/327,886

(22) Filed: Dec. 16, 2011

(65) Prior Publication Data

US 2013/0116801 A1     May 9, 2013

(30) Foreign Application Priority Data

Nov. 8, 2011 (TW) .............................. 100140736 A

(51) Int. Cl.
| | | |
|---|---|---|
| G05B 11/01 | (2006.01) | |
| G05B 19/18 | (2006.01) | |
| G06F 11/00 | (2006.01) | |
| G06F 15/16 | (2006.01) | |
| G06F 3/00 | (2006.01) | |
| G06F 13/12 | (2006.01) | |
| G06F 13/38 | (2006.01) | |

(52) U.S. Cl.
USPC ............... 700/18; 700/65; 702/188; 709/232; 709/250; 710/8; 710/62; 710/72; 710/104

(58) Field of Classification Search
CPC ..... G05B 19/056; H04L 64/34; G06F 13/385; G06F 19/3406; F24F 11/0086; F24F 11/0091; H04M 11/002; H04M 11/007
USPC ........... 700/11, 17, 18, 65, 83; 702/127, 188; 709/230, 232, 250; 710/8, 10, 62–64, 710/72, 100, 104–106
See application file for complete search history.

(56) References Cited

U.S. PATENT DOCUMENTS

| | | | |
|---|---|---|---|
| 5,963,444 A | 10/1999 | Shindara et al. | |
| 6,211,782 B1* | 4/2001 | Sandelman et al. | 340/506 |
| 6,453,210 B1* | 9/2002 | Belotserkovskiy et al. | 700/96 |
| 6,845,401 B1* | 1/2005 | Papadopoulos et al. | 709/250 |
| 6,853,867 B1* | 2/2005 | Klindt et al. | 700/83 |
| 6,973,356 B2* | 12/2005 | Bieber | 700/65 |
| 7,254,512 B2* | 8/2007 | Odom | 702/127 |
| 7,426,590 B2* | 9/2008 | Amrhein et al. | 710/62 |
| 7,539,724 B1* | 5/2009 | Callaghan | 709/205 |
| 7,827,316 B2* | 11/2010 | Kassou et al. | 709/248 |
| 8,005,003 B2* | 8/2011 | Miyazaki et al. | 370/252 |
| 8,189,470 B2* | 5/2012 | Nakashima et al. | 370/231 |
| 2002/0103569 A1* | 8/2002 | Mazur | 700/216 |
| 2003/0005196 A1 | 1/2003 | Reed | |
| 2008/0178202 A1* | 7/2008 | Blackman et al. | 719/327 |

* cited by examiner

*Primary Examiner* — Crystal J Barnes-Bullock
(74) *Attorney, Agent, or Firm* — Muncy, Geissler, Olds & Lowe, P.C.

(57) ABSTRACT

A system, a method and a recording medium for driving a programmable logic controller are disclosed. This system includes a server and an adaptive unit electrically connected to the server. When determining that a programmable logic controller is connected, a hardware layer management module of the adaptive unit informs the server. The server outputs a controller query data to query the programmable logic controller through the hardware layer management module. The server generates a control data conforming to a specification of the programmable logic controller according to a controller response data of the programmable logic controller, for the hardware layer management module to control the programmable logic controller.

16 Claims, 3 Drawing Sheets

SYSTEM, METHOD AND RECORDING MEDIUM FOR DRIVING A PROGRAMMABLE LOGIC CONTROLLER

CROSS-REFERENCE TO RELATED APPLICATION

This application claims the benefit of Taiwan Patent Application No. 100140736, filed on Nov. 8, 2011, which is hereby incorporated by reference for all purposes as if fully set forth herein.

BACKGROUND OF THE INVENTION

1. Field of Invention

The present invention relates to a system, a method and a recording medium for driving a programmable logic controller, and more particularly relates to a system, a method and a recording medium for driving a programmable logic controller capable of automatically detecting, installing and driving the programmable logic controller.

2. Related Art

In a control system of a plant in the prior art, all sorts of automation equipment of plant manufacturers are usually controlled by a plurality of programmable logic controllers (PLC, or referred to as a programmable controller), particularly in a process program. One or more monitor machines are used to transfer relevant parameters with each programmable logic controller, thereby monitoring an operation status of each programmable logic controller or controlling operation behavior of each programmable logic controller.

However, the design system of the programmable logic controller is rather closed, and the research and development manufacturers are seldom to exchange the techniques, which results in the fact that the hardware and software (e.g. program coding and an instruction system) incompatibility often happens to the programmable logic controllers and the monitoring systems thereof from all the manufacturers.

Therefore, the technicians of the plant must manually install a proper driving program and operation management interface for each monitor machine and programmable logic controller, which results in a waste of labor and time costs.

In addition, due to the problem that the programmable logic controllers and the monitoring systems thereof of all the manufacturers are incompatible or furthermore, the programmable logic controller needs a specific monitor machine, the manufacturers have to introduce (or purchase) a large quantity of monitor machines in accordance with the types of the programmable logic controller, which results in the facts that the driving program and the dedicated operation interface are quite complicated and are not easy to manage.

Besides, due to the problem that the programmable logic controllers and the monitoring systems thereof of all the manufacturers are incompatible, the technicians of the plant must learn the control methods and instructions of different machines, which results in the complexity of using the machine. Meanwhile, the technicians are difficult to acquire the relevant parameters of the machines, which decreases the timeliness and reference benefits of the acquired data.

SUMMARY OF THE INVENTION

Accordingly, for solving the above problems, the present invention provides a system, a method and a recording medium for driving a programmable logic controller capable of automatically detecting a programmable logic controller, selecting a corresponding controller driver to install and quickly driving the programmable logic controller.

A system for driving the programmable logic controller disclosed in the present invention includes an adaptive unit and a server. The adaptive unit includes a connection port and a hardware layer management module. The server includes a storage module and an operation module. The storage module stores at least one controller query data and at least one controller driving data corresponding to the at least one controller query data.

When the hardware layer management module determines that the connection port is electrically coupled to a programmable logic controller, the hardware layer management module outputs a controller installation message. When the operation module acquires the controller installation message, the operation module reads the storage module to output the controller query data. The hardware layer management module forwards at least one controller query data to the programmable logic controller, and sends back a controller response message provided by the programmable logic controller to the server. When the operation module acquires the controller response message, the operation module generates a control data corresponding to the programmable logic controller based on the controller driving data, and the hardware layer management module controls the programmable logic controller based on the control data.

A method for driving the programmable logic controller disclosed in the present invention is applicable to a server and an adaptive unit. The adaptive unit includes a hardware layer management module and a connection port connected to the hardware layer management module. The server is electrically connected to the adaptive unit and stores at least one controller query data and at least one controller driving data corresponding to the at least one controller query data. This method includes the following steps. When the hardware layer management module determines that the connection port is electrically coupled to a programmable logic controller, the hardware layer management module outputs a controller installation message to the server. The server outputs at least one controller query data to the hardware layer management module according to the controller installation message. The hardware layer management module transmits the at least one controller query data to the programmable logic controller, and when the programmable logic controller sends back a controller response message, the hardware layer management module transmits the controller response message to the server. The server generates a control data corresponding to the programmable logic controller based on the at least one controller driving data according to the controller response message, and transfers the control data to the hardware layer management module, for the hardware layer management module to control the programmable logic controller.

The present invention further discloses a recording medium, which stores a computer readable program code. A server and an adaptive unit connected to the server read the program code to collaboratively execute a method for driving the programmable logic controller. The processes of the method are described in the above paragraphs, so the details will not be repeated herein.

The present invention has the characteristics that the system automatically detects the existence of the programmable logic controller and further automatically installs the driving data corresponding to the programmable logic controller. The technicians do not need to focus on the driving data installation and the setup of the driving parameters for the programmable logic controller, so the labor and time costs for manually installing are saved and meanwhile a plug and play effect of the programmable logic controller is realized. In addition, the driving data of all sorts of the programmable logic controllers from different manufacturers may be stored in the server in advance and the server establishes the control data directly corresponding to the programmable logic controller in accordance with the driving data of all sorts of the programmable logic controllers, thereby simplifying use and management of a driving program and an dedicated operation interface. Besides, the server can automatically establish the relevant driver and the instructions and formats required for transferring the data. The technicians of the plant do not need to learn control methods and instructions of many machines, thereby reducing the complexity in using the machine. The technicians can acquire relevant parameters of the machine at any time, thereby improving the timeliness and reference benefits of acquired information.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Hereinafter, the present invention is described in details with reference to the embodiments and accompanying drawings.

Figure 1:
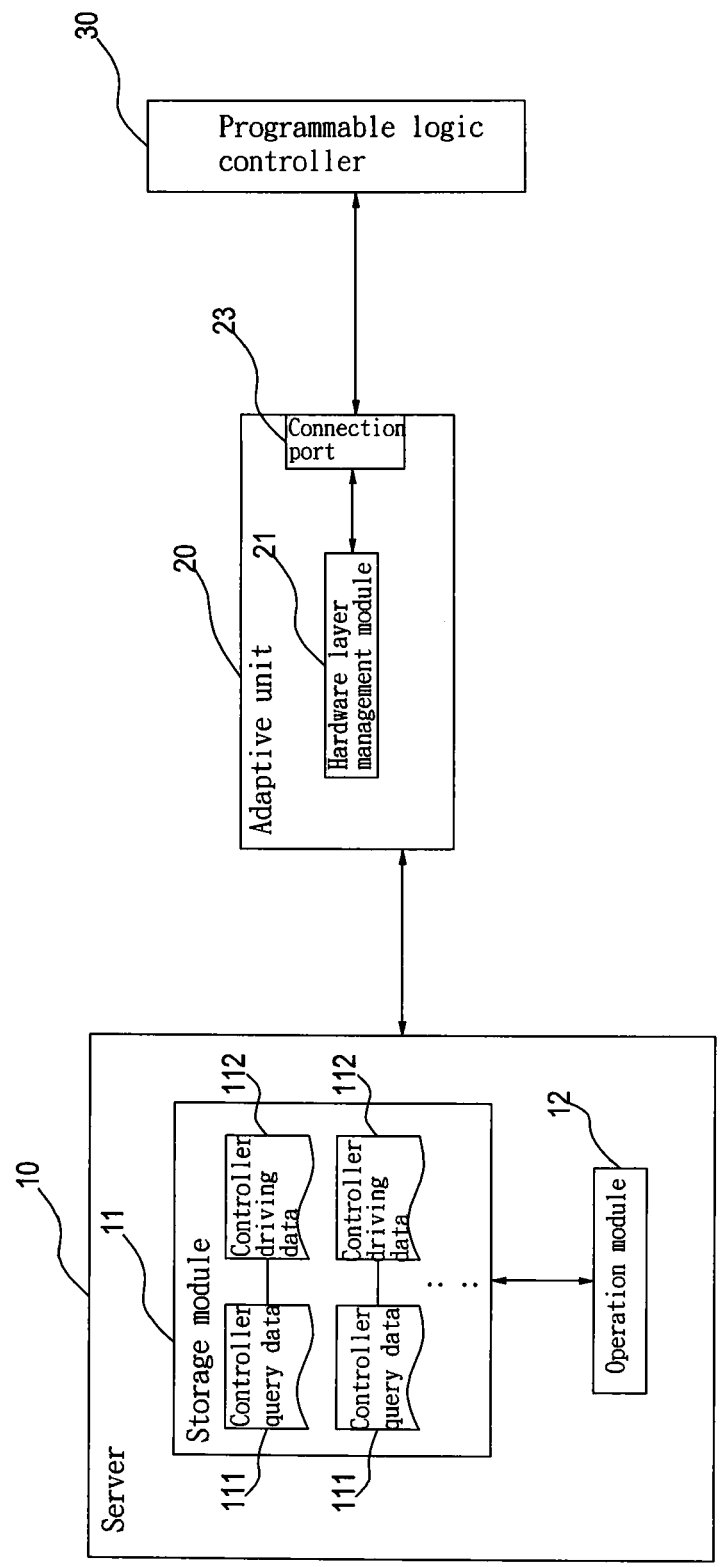
FIG. 1 is a schematic block diagram of a first kind of system for a driving programmable logic controller according to an embodiment of the present invention.

FIG. 1 is a schematic block diagram of a first kind of system for driving a programmable logic controller 30 according to an embodiment of the present invention. Referring to FIG. 1, this system includes a server 10 and an adaptive unit 20 connected to the server 10. The adaptive unit 20 may be an adaptor or a connector of the programmable logic controller 30, for indirectly connecting the programmable logic controller 30 and the server 10.

The adaptive unit 20 for coupling the programmable logic controller 30 includes a connection port 23 and a hardware layer management module 21. The programmable logic controller 30 is coupled to the connection port 23 of the adaptive unit 20, and the connection port 23 is for example but not limited to a serial port or a network port. The hardware layer management module 21 is electrically coupled to the programmable logic controller 30 through the connection port 23.

The server 10 includes an operation module 12 and a storage module 11. The storage module 11 stores one or more controller query data 111 and a controller driving data 112 corresponding to the controller query data 111. For example, the programmable logic controllers from different manufacturers may respectively correspond to different controller query data, and the programmable logic controllers from one manufacturer may correspond to the same controller query data. Or, some types of the programmable logic controllers correspond to the same controller query data, and some types of the programmable logic controllers respectively correspond to the different controller query data. The driving data is for example a controller driving program and setup parameters. Likewise, the programmable logic controllers from different manufacturers usually adopt different controller driving programs. Some types of the programmable logic controllers from one manufacturer may adopt the same controller driving program and some types of the programmable logic controllers from one manufacturer may adopt different controller driving programs. In some embodiments, N kinds of the programmable logic controllers fabricated by a manufacturer may have M kinds of controller query data 111, and normally M is less than N. Each controller query data 111 may respectively correspond to more than one controller driving data 112, and corresponding relation data of the controller query data 111 and the controller driving data 112 may be stored in the storage module 11. For example, a file name of the controller driving data 112 corresponding to each controller query data 111 may be directly stored, or a record directly stores a brand or a type of the programmable logic controller suitable for each controller query data and then records the controller driving program suitable for each brand and type to be served as the corresponding relation data of the controller query data 111 and the controller driving data 112. The operation module 12 may be realized by but not limited to software (an application program), hardware (e.g. an operational element like a central processing unit) or a firmware constituted by the software and the hardware.

When the programmable logic controller 30 is electrically coupled to the connection port 23, working electric power generated when the connection port 23 operates changes. The changes of the working electric power include three situations: (1) a voltage change of the working electric power; (2) a current change of working electric power; (3) both the voltage change and the current change of the working electric power. The situation of changes differs in accordance with a design method of the relevant circuit of the connection port 23.

The hardware layer management module 21 may determine whether the connection port 23 is electrically coupled to the programmable logic controller 30 according to the change of the working electric power. Once the hardware layer management module 21 determines that the connection port 23 is electrically coupled to the programmable logic controller 30, a controller installation message is sent to the server 10.

In some embodiments, when the operation module 12 acquires the controller installation message, i.e. reads controller query data 111 of the storage module 11, and periodically outputs the controller query data 111 to the adaptive unit 20 in a preset sequence, in which at least one of the control query data is output each time. The preset sequence may be set by the system automatically, be set by a user via an operation interface, be determined by a sorting of the frequency of use, be determined by a random sequence or the like, and is not particularly limited. The hardware layer management module 21 transfers the acquired controller query data 111 to the programmable logic controller 30. Once the programmable logic controller 30 can analyze or identify a data format of the controller query data 111, the programmable logic controller 30 generates a corresponding controller response message according to query content of the controller query data 111. After acquiring the controller response message, the hardware layer management module 21 returns the controller response message to the server 10.

When acquiring the controller response message, the operation module 12 generates a control data corresponding to the programmable logic controller 30 based on the controller driving data 112 according to content of the controller response message. The controller response message includes a specification data of the programmable logic controller 30, for example, a brand, a type, control instruction definition, device setup parameters and a data transmission format. For example, the operation module 12 may find out an applicable controller driving data 112 from the controller driving data corresponding to the controller query data sent back according to the acquired controller query data sent back and the brand and type in the response message, and then generates a control data conforming to the specification data based on the controller driving data 112.

In some other embodiments, the operation module 12 may send a controller query data 111 each time. When the controller response data is not acquired within a waiting period, the operation module 12 outputs another controller query data 111 that is not output yet until the controller response data is acquired. When all the controller query data 111 are output even the controller response data is still not acquired, the operation module 12 stops outputting the controller query data 111.

Furthermore, numerical values of the working electric power corresponding to all kinds of the programmable logic controllers 30 are also recorded in the storage module 11 and are in corresponding data association with the controller query data 111.

The hardware layer management module 21 records the numerical value of the working electric power of the connection port 23 in the controller installation message. The operation module 12 outputs the controller query data 111 matching the numerical value of the working electric power with reference to the numerical value of the working electric power.

The control data may be transferred to the adaptive unit 20. The hardware management module controls the programmable logic controller 30 based on the received control data, thus achieving the effect that the programmable logic controller 30 may be automatically detected, quickly installed and used instantly.

Figure 2:
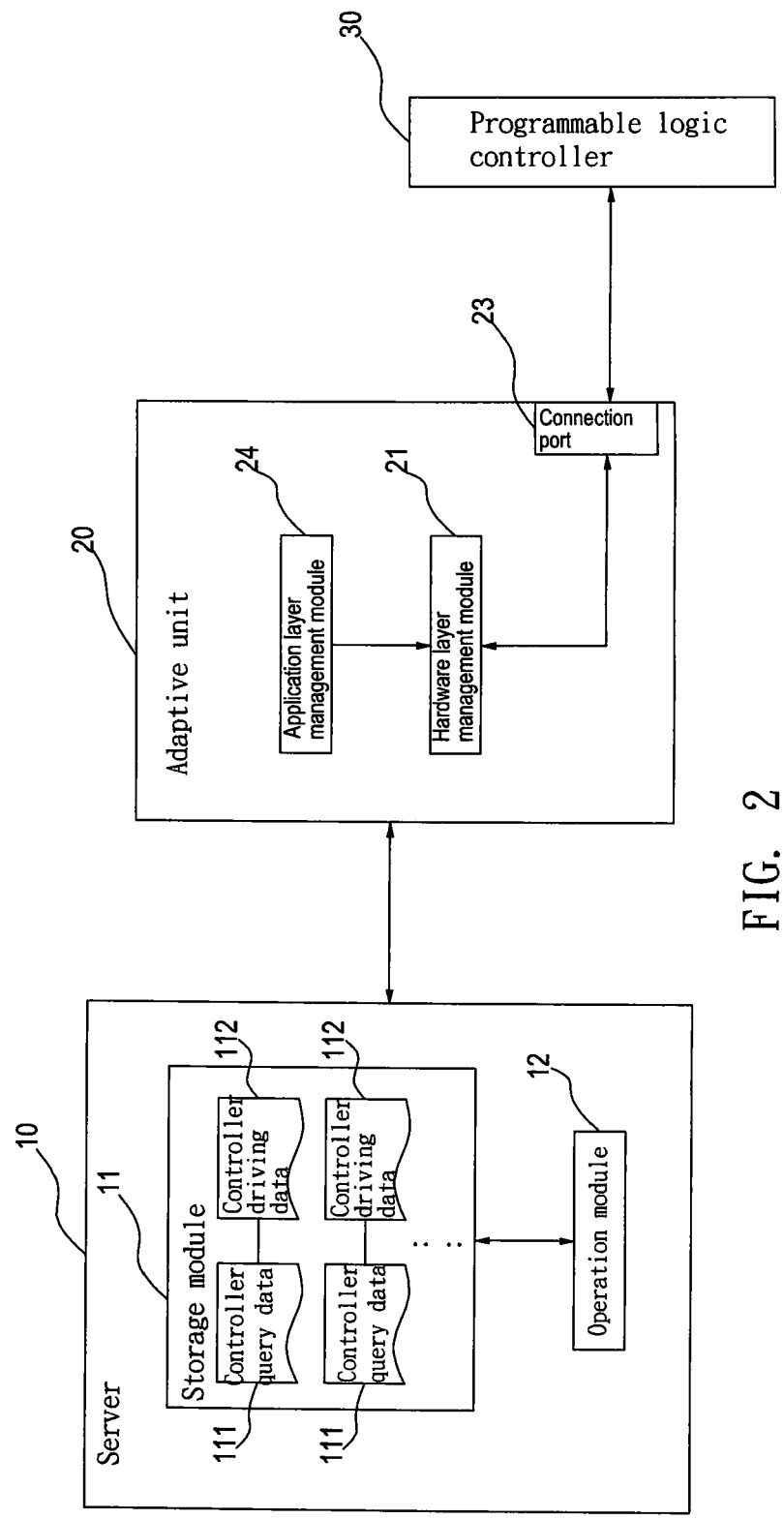
FIG. 2 is a schematic block diagram of a second kind of system for driving a programmable logic controller according to an embodiment of the present invention.

FIG. 2 is a schematic block diagram of a second kind of system for driving a programmable logic controller according to an embodiment of the present invention. Different from the above embodiment, the adaptive unit 20 in FIG. 2 further includes an application layer management module 24, which is software, firmware constituted by specific hardware and software, or a control interface, for the user to input an operation instruction of the programmable logic controller 30. The operation instruction may not include hardware setup parameters of the programmable logic controller 30. Since the hardware layer management module 21 can control the programmable logic controller 30 according to acquired control data, the user is not required to pay attention to installation and setup of the programmable logic controller 30.

The hardware layer management module 21 analyzes control content of the operation instruction and generates a relevant control instruction corresponding to the control data, so as to output the relevant control instruction to the programmable logic controller 30. The programmable logic controller 30 executes a corresponding operation according the relevant control instruction. For example, the programmable logic controller 30 controls hardware thereof to execute a specific action, or returns an operation status of the hardware thereof, or the like, and the operation is not limited to this and may be determined according to the requirement of the operation instruction.

Figure 3:
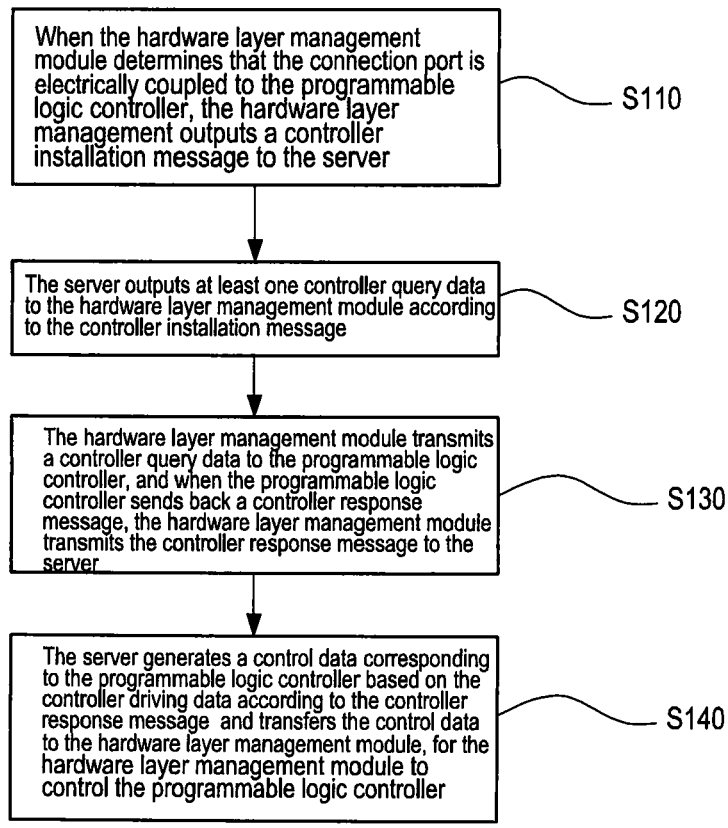
FIG. 3 is a schematic flow chart of a method for a driving programmable logic controller according to an embodiment of the present invention.

FIG. 3 is a schematic flow chart of a method for driving a programmable logic controller 30 according to an embodiment of the present invention. The method is applicable to a server 10 and an adaptive unit 20 electrically connected to the server 10. The adaptive unit 20 is used for connecting the programmable logic controller 30, and includes a hardware layer management module 21 and a connection port 23 connected to the hardware layer management module 21. The server 10 stores at least one controller query data and at least one controller driving data corresponding to the at least one controller query data, with reference to FIG. 1 for a better understanding. The processes of this method are described as follows.

When the hardware layer management module determines that the connection port is electrically coupled to the programmable logic controller, the hardware layer management module outputs a controller installation message to the server (step S110). As described above, when the programmable logic controller 30 is electrically coupled to the connection port 23, working electric power generated when the connection port 23 operates changes. In other words, when the working electric power changes, the hardware layer management module 21 determines that the connection port 23 is electrically coupled to the programmable logic controller 30. Once the hardware layer management module 21 determines that the connection port 23 is electrically coupled to the programmable logic controller 30, a controller installation message is sent to the server 10. The changes of the working electric power include three situations: (1) a voltage change of the working electric power; (2) a current change of the working electric power; (3) both the voltage change and the current change of the working electric power. The situation of changes differs in accordance with a design method of the relevant circuit of the connection port 23.

The server outputs at least one controller query data to the hardware layer management module according to the controller installation message (step S120). In this step, when acquiring the controller installation message, the operation module 12 reads the controller query data 111 stored in the storage module 11 and outputs at least one of the read controller query data 111 to the adaptive unit 20. The operation module 12 determines the controller query data 111 to be output each time from the plurality of the controller query data 111 in any preset sequence.

The hardware layer management module transmits the controller query data to the programmable logic controller, and when the programmable logic controller sends back a controller response message, the hardware layer management module transmits the controller response message to the server (step S130). The hardware layer management module 21 transfers the acquired controller query data 111 to the programmable logic controller 30. Once the programmable logic controller 30 can analyze or identify a data format of the controller query data 111, the programmable logic controller 30 generates a corresponding controller response message according to query content of the controller query data 111. After acquiring the controller response message, the hardware layer management module 21 returns the controller response message to the server 10.

The server generates a control data corresponding to the programmable logic controller based on the controller driving data according to the controller response message and transfers the control data to the hardware layer management module, for the hardware layer management module to control the programmable logic controller (step S140).

In this step, when acquiring the controller response message, the operation module 12 generates a control data conforming to specification data based on the controller driving data 112 according to the specification data of the programmable logic controller 30 contained in the controller response message, and transfers the control data to the adaptive unit 20. The adaptive unit 20 controls an operation of the programmable logic controller 30 based on the control data.

Furthermore, the server 10 determines whether a controller response data provided by the programmable logic controller 30 is acquired within a waiting period. When the server 10 determines that the controller response data provided by the programmable logic controller 30 is not acquired, the procedure returns to step S120 to output another controller query data 111 that is not output before until the server 10 acquires the controller response message. As described above, when the operation module 12 sends the controller query data 111, a waiting period starts to be counted. As long as the controller response data is not acquired within the waiting period, the operation module 12 outputs a different controller query data 111 until the controller response data is acquired. If all the controller query data 111 are output but the controller response data is still not acquired, the operation module 12 stops outputting the controller query data 111.

Figure 4:
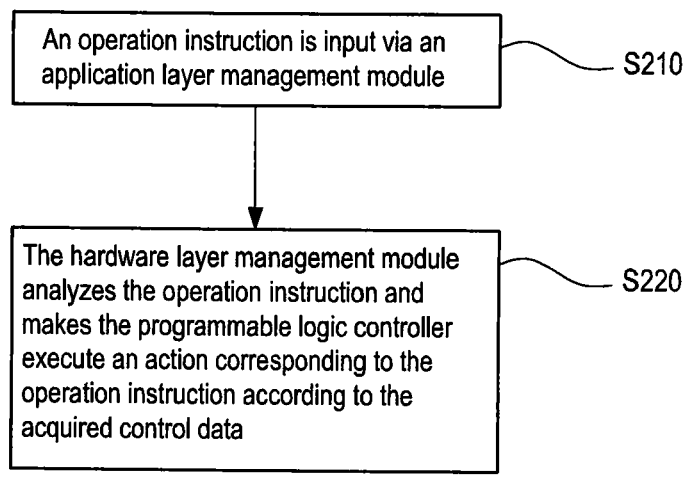
FIG. 4 is a schematic extended flow chart of inputting an operation instruction via an application layer management module according to an embodiment of the present invention method.

FIG. 4 is a schematic flow chart of details of inputting an operation instruction via an application layer management module in a method for driving a programmable logic controller according to an embodiment of the present invention method. The application mode after the setup of the programmable logic controller is illustrated, with reference to FIG. 1 and FIG. 2 for better understanding. The processes are described as follows.

An operation instruction is input via an application layer management module 24 (step S210). As described above, the application layer management module 24 is used for the user to input the operation instruction of the programmable logic controller 30 and the operation instruction may not include hardware setup parameters of the programmable logic controller 30.

The hardware layer management module 21 analyzes the operation instruction and makes the programmable logic controller execute an action corresponding to the operation instruction according to acquired control data (step S220). As described above, the hardware layer management module 21 has acquired the control data for controlling the programmable logic controller 30 in advance. Therefore, after analyzing the control content of the operation instruction, the hardware layer management module 21 makes the programmable logic controller 30 perform operation corresponding to the operation instruction based on the control data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for driving a programmable logic controller, comprising:
an adaptive unit, comprising a hardware layer management module and a connection port connected to the hardware layer management module, wherein when the hardware layer management module determines that the connection port is electrically coupled to the programmable logic controller, the hardware layer management module outputs a controller installation message; and
a server, electrically connected to the adaptive unit, comprising a storage module and an operation module, wherein the storage module is used for storing at least one controller query data and at least one controller driving data corresponding to the at least one controller query data, and the operation module is used for reading the storage module according to the controller installation message to output at least one controller query data to the hardware layer management module,
wherein the hardware layer management module further transmits the at least one controller query data to the programmable logic controller and when the programmable logic controller sends back a controller response message, transmits the controller response message to the operation module; and
wherein the operation module further generates control data corresponding to the programmable logic controller based on the at least one controller driving data according to the controller response message, and transfers the control data to the hardware layer management module, for the hardware layer management module to control the programmable logic controller.

2. The system for driving the programmable logic controller according to claim 1, wherein the connection port has a working electric power, the working electric power changes when the connection port is electrically coupled to the programmable logic controller, and the hardware layer management module determines whether the connection port is electrically coupled to the programmable logic controller according to the change of the working electric power.

3. The system for driving the programmable logic controller according to claim 2, wherein each of the controller query data corresponds to a numerical value of a different working electric power, the hardware layer management module records the numerical value of the working electric power in the controller installation message, and the operation module outputs the at least one controller query data matching the numerical value of the working electric power.

4. The system for driving the programmable logic controller according to claim 2, wherein the change of the working electric power refers to a voltage change, a current change, or both the voltage change and the current change.

5. The system for driving the programmable logic controller according to claim 1, wherein when outputting the at least one controller query data according to the controller installation message, the operation module outputs one of the at least one controller query data each time in a preset sequence.

6. The system for driving the programmable logic controller according to claim 1, wherein the controller response message comprises a specification data of the programmable logic controller, and the operation module generates a control data conforming to the specification data based on the controller driving data.

7. The system for driving the programmable logic controller according to claim 1, wherein the adaptive unit further comprises an application layer management module, for inputting an operation instruction, the hardware layer management module analyzes the operation instruction and makes the programmable logic controller execute an action corresponding to the operation instruction according to the acquired control data.

8. A method for driving a programmable logic controller, applicable to a server and an adaptive unit, wherein the adaptive unit comprises a hardware layer management module and a connection port connected to the hardware layer management module, the server is electrically connected to the adaptive unit, the server stores at least one controller query data and at least one controller driving data corresponding to the at least one controller query data, the method comprising:

when the hardware layer management module determines that the connection port is electrically coupled to a programmable logic controller, outputting a controller installation message to the server;

the server outputting at least one controller query data to the hardware layer management module according to the controller installation message;

the hardware layer management module transmitting the at least one controller query data to the programmable logic controller, and when the programmable logic controller sends back a controller response message, transmitting the controller response message to the server; and the server generating a control data corresponding to the programmable logic controller based on the at least one controller driving data according to the controller response message, and transferring the control data to the hardware layer management module, for the hardware layer management module to control the programmable logic controller.

9. The method for driving the programmable logic controller according to claim 8, wherein the connection port has a working electric power, the working electric power changes when the connection port is electrically coupled to the programmable logic controller, and the hardware layer management module analyzes whether the working electric power of the connection port changes so as to determine whether the connection port is electrically coupled to the programmable logic controller.

10. The method for driving the programmable logic controller according to claim 9, wherein the hardware layer management module records a numerical value of the working electric power in the controller installation message, and in the step of the server outputting at least one controller query data according to the controller installation message, the server outputs the at least one controller query data matching the numerical value of the working electric power.

11. The method for driving the programmable logic controller according to claim 9, wherein the change of the working electric power refers to a voltage change, a current change, or both the voltage change and the current change.

12. The method for driving the programmable logic controller according to claim 8, wherein the adaptive unit further comprises an application layer management module, and after determining that the connection port is electrically coupled to the programmable logic controller, the method further comprises:

inputting an operation instruction via the application layer management module; and the hardware layer management module analyzing the operation instruction, and making the programmable logic controller execute an action corresponding to the operation instruction according to the acquired control data.

13. The method for driving the programmable logic controller according to claim 8, wherein when the server outputs the at least one controller query data according to the controller installation message, the server outputs one of the at least one controller query data each time in a preset sequence.

14. The method for driving the programmable logic controller according to claim 8, wherein the controller response message comprises a specification data of the programmable logic controller, and the generated control data conforms to the specification data.

15. A recording medium, for storing a computer readable program code which is read by a server and an adaptive unit to collaboratively execute a method for driving a programmable logic controller, wherein the adaptive unit comprises a hardware layer management module and a connection port connected to the hardware layer management module, the server is electrically connected to the adaptive unit, the server stores at least one controller query data and at least one controller driving data corresponding to the at least one controller query data, and the method comprises:

when the hardware layer management module determines that the connection port is electrically coupled to a programmable logic controller, the hardware layer management module outputting a controller installation message to the server;

the server outputting at least one controller query data to the hardware layer management module according to the controller installation message;

the hardware layer management module transmitting the at least one controller query data to the programmable logic controller, and when the programmable logic controller sends back a controller response message, transmitting the controller response message to the server; and the server generating a control data corresponding to the programmable logic controller based on the at least one controller driving data according to the controller response message, and transferring the control data to the hardware layer management module, for the hardware layer management module to control the programmable logic controller.

16. The recording medium according to claim 15, wherein the adaptive unit further comprises an application layer management module, and after determining that the connection port is electrically coupled to the programmable logic controller, the method further comprises:

inputting an operation instruction via the application layer management module; and the hardware layer management module analyzing the operation instruction and making the programmable logic controller execute an action corresponding to the operation instruction according to the acquired control data.

* * * * *